(12) United States Patent
Bahattab et al.

(10) Patent No.: US 9,073,057 B2
(45) Date of Patent: Jul. 7, 2015

(54) METHOD FOR SEPERATING SUBMICRON FRACTION OF CARBON NANO-MATERIALS

(71) Applicants: King Abdul Aziz City for Science and Technology, Riyadh (SA); Chemical Physics Technologies Ltd., Minsk (BY)

(72) Inventors: Mohammed A Abdullah Bahattab, Riyadh (SA); Siarhei Zhdanok, Minsk (BY); Andrei Krauklis, Minsk (BY); Kirill Borisevich, Minsk (BY); Pavel Stanavy, Minsk (BY)

(73) Assignee: King Abdulaziz City for Science and Technology, Riyadh (SA)

( * ) Notice: Subject to any disclaimer, the term of this patent is extended or adjusted under 35 U.S.C. 154(b) by 29 days.

(21) Appl. No.: 14/096,025

(22) Filed: Dec. 4, 2013

(65) Prior Publication Data

US 2015/0151306 A1 Jun. 4, 2015

(51) Int. Cl.
*B02C 19/00* (2006.01)
*B02C 23/20* (2006.01)
*B02C 19/18* (2006.01)
*B02C 23/08* (2006.01)

(52) U.S. Cl.
CPC ............... *B02C 23/20* (2013.01); *B02C 19/18* (2013.01); *B02C 23/08* (2013.01); *B02C 19/0056* (2013.01)

(58) Field of Classification Search
CPC .. B82Y 40/00; C01B 31/0266; C01B 31/0273; C01B 31/028; C01B 31/0253; B02C 19/00; B02C 19/0056; B02C 23/08; B02C 19/18; B02C 23/20; C10M 111/04
USPC ...................................... 241/21, 30, 1, 20, 32
See application file for complete search history.

(56) References Cited

U.S. PATENT DOCUMENTS

2010/0143686 A1 * 6/2010 Zhu ................................ 428/220
2013/0302592 A1 * 11/2013 Lee et al. ....................... 428/323

FOREIGN PATENT DOCUMENTS

CN 101717682 A * 6/2010

* cited by examiner

*Primary Examiner* — Mark Rosenbaum
(74) *Attorney, Agent, or Firm* — Timberline Patent Law Group PLLC

(57) ABSTRACT

The invention provides a method for separating submicron fraction of carbon nano-materials. The method includes grinding of the carbon nano-materials. Upon grinding, the carbon nano-materials are mixed in water to prepare a mixture. The mixture is then treated in an ultrasonic bath to prepare a suspension. The suspension is allowed to undergo a liquid sedimentation. After the liquid sedimentation, a supernatant is collected and filtered to obtain a solid residue of the submicron fraction of the carbon nano-materials.

13 Claims, 5 Drawing Sheets

METHOD FOR SEPERATING SUBMICRON FRACTION OF CARBON NANO-MATERIALS

FIELD OF THE INVENTION

The invention generally relates to carbon nano-materials. More specifically, the invention relates to a method for separating submicron fraction of carbon nano-materials.

BACKGROUND OF THE INVENTION

Nanoparticles such as, carbon nano-materials, are widely used in various industries as nano-crystalline and other nano-scale features of nano-particles dramatically change properties of a material. Typically, an average size of nano-particles is about less than 1 micrometer (ρm). Certain materials fabricated from nano-particles often possess superior mechanical properties compared with the same material fabricated with conventionally sized starting materials such as powders. Nano-particles of certain materials also possess unique electrical and magnetic properties. Further, extremely large surface area to weight ratio of nano-particles allows nano-particles to interact with surroundings quickly. An ability to produce a material in a nano-particle form represents a unique opportunity to design and develop a wide range of new and useful applications such as, but not limited to, mechanical, optical, electrical and chemical applications. The production of the nano-particles with desired size and composition is mostly in small amount such as in grams whereas the requirement of the nano-particles in most industries is in large amount such as in kilograms.

During synthesis of the carbon nano-materials, the final product formed from carbon includes a set of different formations. The set of different formations includes approximately 24 weight percent (wt %) to 40 wt % of carbon nano-fibers, 10 wt % to 15 wt % of single-walled carbon nanotubes, 10 wt % to about 15 wt % of multi-walled carbon nanotubes, 10 wt % of solid graphite aggregates and about 5 wt % of metal particles. Further, the synthesized carbon nano-materials are required to be subjected to different cleaning procedures to remove admixtures. Further, extracting submicron fraction of carbon nano-material is a labor intensive and expensive process.

There are certain methods known in the art which are used for producing submicron fraction of water insoluble and poorly soluble substances. One such method includes mixing a solvent in water to prepare a solution. Further, the substance is dissolved in the solution. After dissolving the substance in the solution, second solvent is mixed with the solution to produce a preliminary suspension. The preliminary suspension is treated in ultrasonic bath. Thereafter, the solvent is removed and the submicron fraction of the substance is fixed. Alternatively, there is another method which is used for producing the submicron fraction of water insoluble and poorly soluble substances and the method is dependent on water to obtain the submicron fraction. This method includes dissolving a surface active substance in water to form a solution. After dissolving the surface active substance, carbon nano-materials is added to the solution to obtain a mixture. The mixture is treated in an ultrasonic bath to obtain submicron fraction. Further, the surface-active substance is required to be removed from the solution.

Therefore, there is a need to develop an improved method for separating the submicron fraction of carbon nano-materials which is easier and cost effective.

BRIEF DESCRIPTION OF THE FIGURE

The accompanying figure together with the detailed description below forms part of the specification and serves to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily for method steps related to separating submicron fraction of carbon nano-materials.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a method for separating submicron fraction of carbon nano-materials. The method includes grinding of the carbon nano-materials. The carbon nano-materials are mixed in water to prepare a mixture. Further, the method includes treating the mixture in an ultrasonic bath to prepare a suspension. The suspension is allowed to undergo a liquid sedimentation. After the liquid sedimentation, three layers are formed which includes a film, a supernatant and sediments. Further, the film is removed and the supernatant is collected for filtering. Thereafter, the method includes filtering the supernatant using a filter paper to collect the solid residue of the submicron fraction of the carbon nano-materials.

Figure 1:
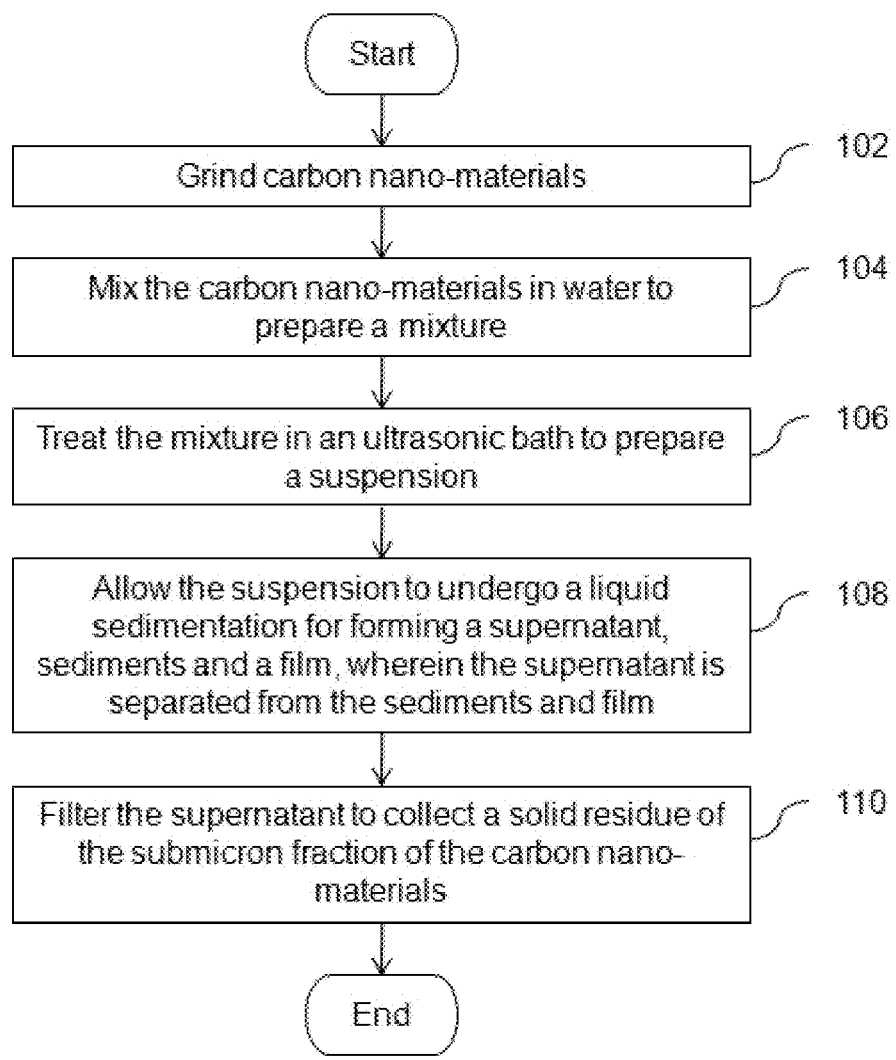
FIG. 1 illustrates a flow diagram of a method for separating submicron fraction of carbon nano-materials in accordance with an embodiment of the invention.

FIG. 1 illustrates a flow diagram of a method for separating submicron fraction of carbon nano-materials in accordance with an embodiment of the invention. Carbon nano-materials synthesized using any conventional technique is taken as a starting material for separating the submicron fraction of the carbon nano-materials. The carbon nano-materials include one or more of, but not limited to, carbon nanotubes, carbon nano-fibers, carbon nanoparticles, graphene and amorphous carbon. Further, the carbon nano-materials includes one or more types of carbon nano-materials such as, but not limited to, single-walled carbon nano-materials, double-walled carbon nano-materials and multi-walled carbon nano-materials.

At step 102, the carbon nano-materials are ground. Any suitable grinding machine such as, but not limited to, a roll crusher, a ball mill or an impeller breaker can be used for grinding the carbon nano-materials and as such those devices which would be apparent to those ordinarily skilled in the art. In an embodiment, the carbon nano-materials is ground in a ball mill with a speed of about 2000 revolutions per minute (rpm) to about 8000 rpm for a period of about 15 minutes to about 45 minutes. In another embodiment, the carbon nano-materials are ground in a ball mill with a speed of 6000 rpm for a period of about 30 minutes.

At step 104, the carbon nano-materials are mixed in water to prepare a mixture. The mixture includes the carbon nano-materials and the water in a ratio of about 1:100. Any suitable mechanical mixing devices such as, but not limited to, mixer, magnetic stirrer, vibrating plates and motor-driven stirring blades can be used for mixing the carbon nano-materials in the water and as such those devices which would be apparent to those ordinarily skilled in the art. In an embodiment, the carbon nano-materials are mechanically mixed with water at the speed of about 200 rpm to about 800 rpm for a period of about 5 minutes to about 20 minutes. In another embodiment, the carbon nano-materials are mechanically mixed with water at the speed of 400 rpm for a period of 10 minutes.

Thereafter, at step 106, the mixture is treated in an ultrasonic bath to prepare a suspension. In an embodiment, the mixture is treated in the ultrasonic bath at a frequency of about 24 kilohertz (khz), power of about 100 Watt (W) to about 800 W and for a period of about 10 minutes to about 30 minutes. In another embodiment, the mixture is treated in the ultrasonic bath at a frequency of about 24 kilohertz (Khz), power of 600 W and for a period of 20 minutes.

Thereafter, the suspension is allowed to undergo liquid sedimentation at step 108. The suspension is allowed to undergo the liquid sedimentation for a period of about 24 hours. During liquid sedimentation, particles in the suspension are allowed to settle as sediments at the bottom. After the liquid sedimentation, three layers are formed which includes a film, a supernatant and the sediments. The film formed at the surface is removed after the sediments are settled at the bottom. The film can be removed using hands. Thereafter, the supernatant is decanted. After decanting the supernatant, the sediments are dried and used as a starting material in step 102.

Finally, at step 110, the supernatant is filtered to collect a solid residue of the submicron fraction of the carbon nano-materials. The supernatant is filtered using a filter paper such as, but not limited to, filter paper FM-111 according to Russian state standard 12026-76. The solid residue can be gathered from a filter in the form of slush and stored.

Further, the solid residue of the submicron fraction of carbon nano-materials can be dried and then stored. In an embodiment, the solid residue is dried at a temperature of about 100 degree Celsius (° C.) to about 110° C. for a period of about 3 hours. After drying, the residue can be stored as a dry powder.

The slush and the dry powder can be renewed and tested for stability. The stability of the obtained submicron fraction of the carbon nano-materials is retained for not less than 6 months.

Working Example 25 grams (g) of carbon nano-materials are ground in a ball mill at a speed of 6000 rpm for a period of 30 minutes. After grinding, 25 g of carbon nano-materials are mixed with 2.5 liter (l) of water to prepare a suspension. A mixer is used to mix 25 g of carbon nano-materials with 2.5 l of water at a speed of 400 rpm for a period of 10 minutes. The suspension is treated in an ultrasonic bath at a frequency of 24 Khz, power of 200 W and for a period of 20 minutes. After treating the suspension in the ultrasonic bath, the suspension is allowed to undergo sedimentation for a period of 24 hours. After sedimentation, the suspension is divided into three layers of a film, a supernatant and sediments. The film is removed and the supernatant is decanted. The sediments are dried and reused as a starting material. The supernatant is filtered using a filter paper FM-111 according to Russian state standard 12026-76. After filtration, the submicron fraction of the carbon nano-materials is gathered from the filter paper in the form of slush and stored. Alternatively, the submicron fraction of the carbon nano-materials is gather from the filter paper and dried at a temperature of 100° C. to 110° C. for 3 hours. After drying, the submicron fraction of the carbon nano-materials is stores in the form of a dry powder.

Figure 2:
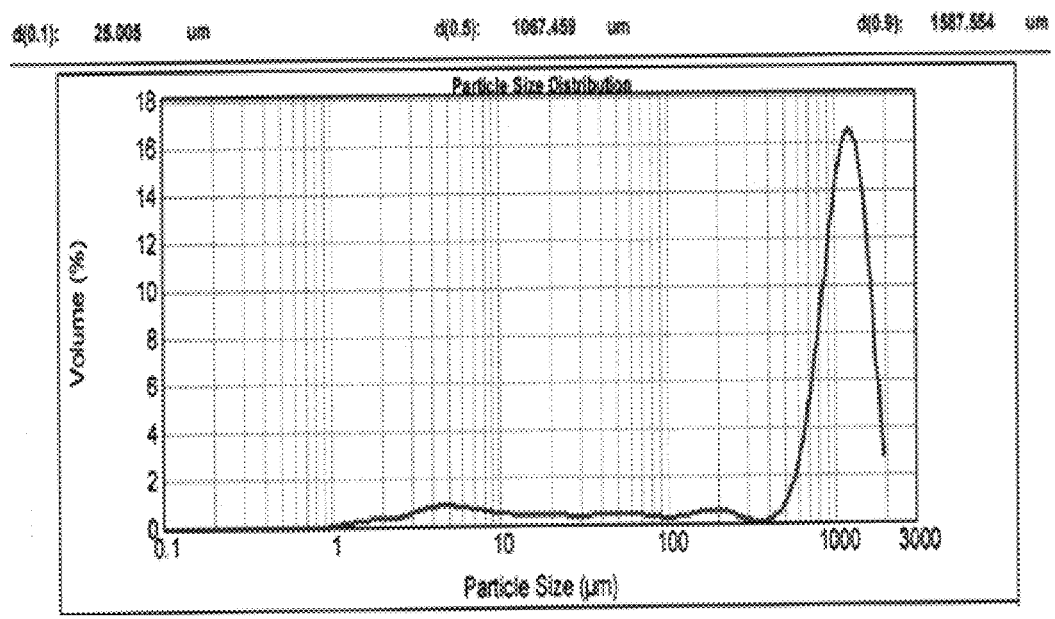
FIG. 2 illustrates a graph representing dependence of percentage of particles on size of carbon nano-materials in a starting material.
Figure 3:
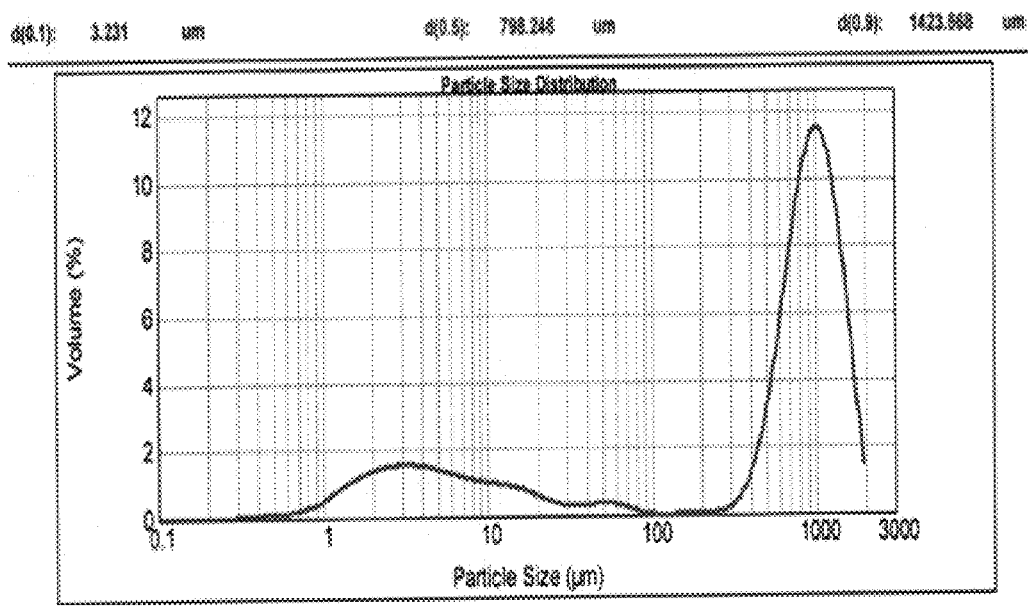
FIG. 3 illustrates a graph representing dependence of percentage of particles on size of carbon nano-materials after grinding.
Figure 4:
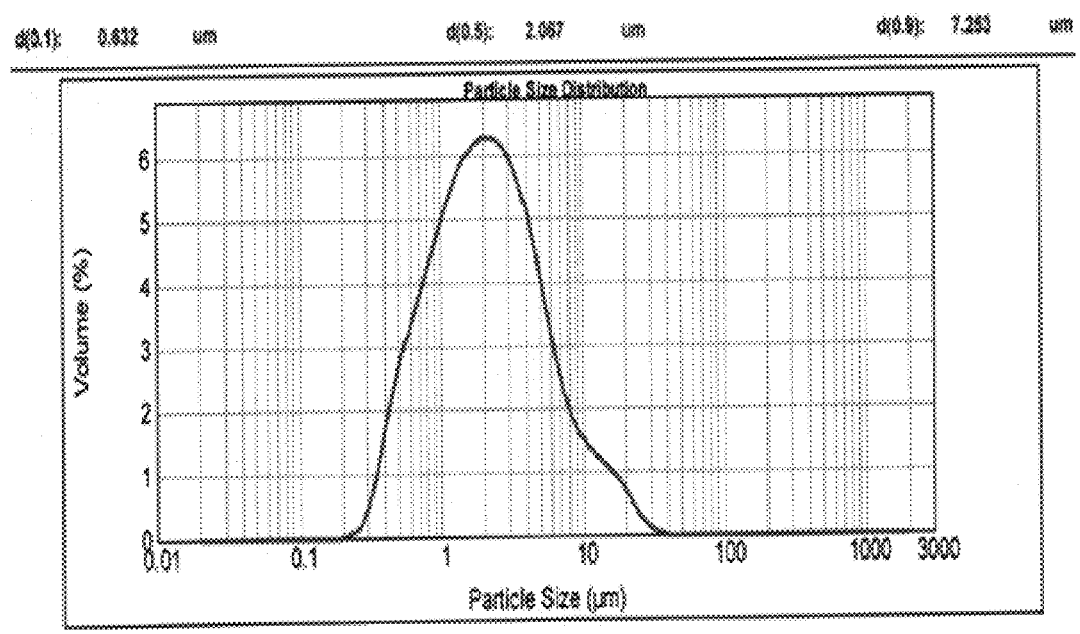
FIG. 4 illustrates a graph representing dependence of percentage of particles on size of carbon nano-materials after treating in an ultrasonic bath.
Figure 5:
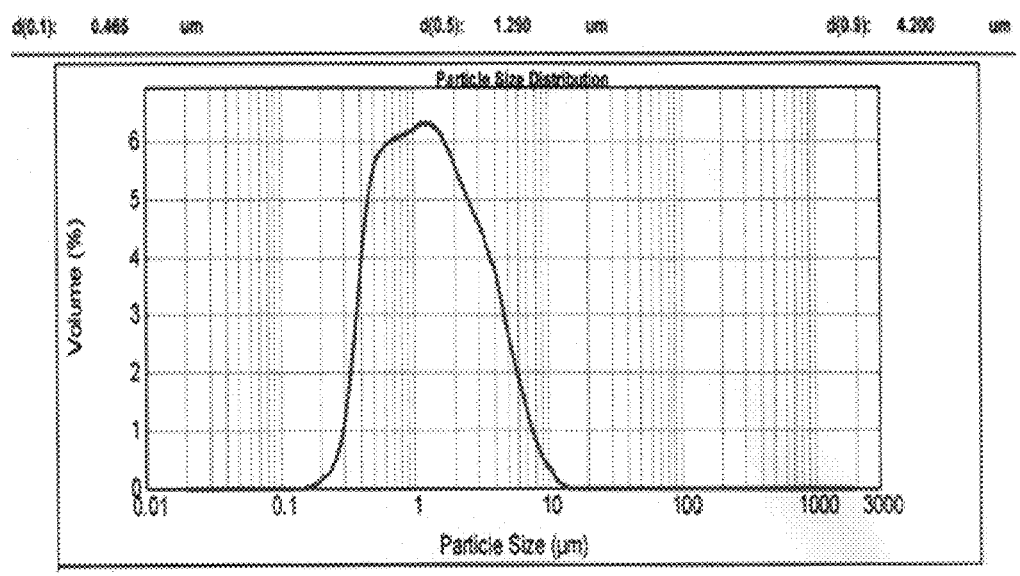
FIG. 5 illustrates a graph representing dependence of percentage of particles on size of carbon nano-materials in the supernatant after sedimentation process for 24 hours.

FIGS. 2 to 5 illustrate graphs representing dependence of percentage of particles on size of carbon nano-materials at different method steps in accordance with an embodiment of the invention. The results of FIGS. 2 to 5 were obtained on a laser analyzer such as Analysette 22 Nanotec®. Along an abscissa axis of the graph, particle sizes are presented in micrometer (µm). Along an ordinate axis of the graph, volume part of particles is presented in percentage (%). The graph represents the particle size in the interval of 800 µm to 2000 µm. FIG. 2 illustrates a graph representing dependence of percentage of particles on size of carbon nano-materials in a starting material. FIG. 3 illustrates a graph representing dependence of percentage of particles on size of carbon nano-materials after grinding. In FIG. 3, the volume part of the particles increases slightly between 1 µm and 70 µm. FIG. 4 illustrates a graph representing dependence of percentage of particles on size of carbon nano-materials after treating in an ultrasonic bath. In FIG. 4, the particles are mostly placed in the range from 0.3 µm to 11 µm. FIG. 5 illustrates a graph representing dependence of percentage of particles on size of carbon nano-materials in the supernatant after sedimentation process for 24 hours. In FIG. 5, the particles are mostly placed in the range from 0.04 µm to 10 µm.

Various embodiments of the invention provide an improved method for separating submicron fraction of carbon nano-materials. The invention provides an easier, a cost effective, an effortless and not a labor intensive process for separating the submicron fraction of the carbon nano-materials. The invention also provides a method for obtaining the submicron fraction of the carbon nano-materials on a large scale.

Various embodiments of the invention provide submicron fraction of carbon nano-materials which can be used in a wide range of new and useful applications such as, but not limited to, mechanical, optical, electrical and chemical applications. The submicron fraction of carbon nano-materials can be used in the chemical applications such as, but not limited to, paintwork, plastics and building materials.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for separating submicron fraction of carbon nano-materials, the method comprising:
    grinding the carbon nano-materials;
    mixing the carbon nano-materials in water to prepare a mixture;
    treating the mixture in an ultrasonic bath to prepare a suspension;
    allowing the suspension to undergo a liquid sedimentation for forming a supernatant, sediments and a film, wherein the supernatant is separated from the sediments and film; and
    filtering the supernatant to collect a solid residue of the submicron fraction of the carbon nano-materials.

2. The method of claim 1, further comprising drying the solid residue.

3. The method of claim 2, wherein the solid residue is dried at a temperature of about 100 degree Celsius (° C.) to about 110° C. for a period of about 3 hours.

4. The method of claim 1, wherein the carbon nano-materials comprise at least one of nanotubes, nanofibers, nanoparticles, graphene and amorphous carbon.

5. The method of claim 1, wherein the carbon nano-materials comprise at least one of single-walled carbon nano-materials, double-walled carbon nano-materials and multi-walled carbon nano-materials.

6. The method of claim 1, wherein the carbon nano-materials are ground with a speed of about 2000 revolutions per minute (rpm) to about 8000 rpm for a period of about 15 minutes to about 45 minutes.

7. The method of claim 1, wherein the mixture comprises the carbon nano-materials and the water in a ratio of about 1:100.

8. The method of claim 1, wherein the carbon nano-materials are mechanically mixed with water at the speed of about 200 rpm to about 800 rpm for a period of about 5 minutes to about 20 minutes.

9. The method of claim 8, wherein the mixture is treated in the ultrasonic bath at a frequency of about 24 kilohertz (khz), power of about 100 Watt (W) to about 800 W and for a period of about 10 minutes to about 30 minutes.

10. The method of claim 1, wherein the liquid sedimentation comprises:
    allowing particles in the suspension to settle as sediments at the bottom;
    removing the film formed on a surface after the sediments are settled at the bottom; and
    decanting the supernatant.

11. The method of claim 1, wherein the liquid sedimentation is carried out for a period of about 24 hours.

12. The method of claim 1, wherein the filtering is carried out using a paper filter.

13. The method of claim 1, wherein the submicron fraction of the carbon nano-materials is stored as slush or powder.

* * * * *